ized>US007527838B2

United States Patent
Correia (10) Patent No.: US 7,527,838 B2
(45) Date of Patent: May 5, 2009

(54) ARCHITECTURAL UNIT POSSESSING TRANSLUCENT SILICONE RUBBER COMPONENT

(75) Inventor: Reuben Correia, Watervliet, NY (US)

(73) Assignee: Momentive Performance Materials Inc., Albany, NY (US)

( * ) Notice: Subject to any disclaimer, the term of this patent is extended or adjusted under 35 U.S.C. 154(b) by 453 days.

(21) Appl. No.: 11/399,557

(22) Filed: Apr. 6, 2006

(65) Prior Publication Data

US 2007/0237912 A1   Oct. 11, 2007

(51) Int. Cl.
   *E06B 3/24*   (2006.01)
(52) U.S. Cl. .................. 428/34; 156/109; 428/428; 428/429; 428/448; 52/786.1; 52/786.13
(58) Field of Classification Search ........................ None
   See application file for complete search history.

(56) References Cited

U.S. PATENT DOCUMENTS

| 3,361,709 | A |   | 1/1968  | Bown et al. |
| 3,953,487 | A |   | 4/1976  | Kratel et al. |
| 3,957,603 | A |   | 5/1976  | Rhodes |
| 4,304,897 | A | * | 12/1981 | Bluestein ..................... 528/20 |
| 4,307,023 | A |   | 12/1981 | Ettlinger et al. |
| 5,039,735 | A | * | 8/1991  | Arai et al. ................... 524/726 |
| 5,093,454 | A | * | 3/1992  | Fujimoto et al. ............. 528/34 |
| 5,120,379 | A |   | 6/1992  | Noda et al. |
| 5,567,530 | A |   | 10/1996 | Drujon et al. |
| 5,653,073 | A |   | 8/1997  | Palmer |
| 5,686,054 | A |   | 11/1997 | Barthel et al. |
| 5,804,253 | A |   | 9/1998  | Hagiwara et al. |
| 5,849,832 | A |   | 12/1998 | Virnelson et al. |
| 5,973,057 | A |   | 10/1999 | Schoeley et al. |
| 6,136,446 | A |   | 10/2000 | Virnelson et al. |
| 6,136,910 | A |   | 10/2000 | Virnelson et al. |
| 6,150,441 | A |   | 11/2000 | Chiba et al. |
| 6,183,867 | B1 |   | 2/2001  | Barthel et al. |
| 6,235,832 | B1 |   | 5/2001  | Deng et al. |
| 6,238,755 | B1 | * | 5/2001  | Harvey et al. ................... 428/34 |
| 6,248,204 | B1 |   | 6/2001  | Schuft |
| 6,284,360 | B1 |   | 9/2001  | Johnson et al. |
| 6,319,965 | B1 | * | 11/2001 | Kamohara et al. .......... 523/120 |
| 6,361,709 | B1 |   | 3/2002  | Bauer et al. |
| 6,372,827 | B2 |   | 4/2002  | Johnson et al. |
| 6,406,782 | B2 |   | 6/2002  | Johnson et al. |
| 6,457,294 | B1 |   | 10/2002 | Virnelson et al. |
| 6,566,443 | B2 |   | 5/2003  | Morimoto et al. |
| 6,784,272 | B2 |   | 8/2004  | Mack et al. |
| 6,800,413 | B2 |   | 10/2004 | Barthel et al. |
| 6,809,136 | B2 |   | 10/2004 | Sakamoto et al. |
| 6,828,403 | B2 |   | 12/2004 | Mahdi et al. |
| 6,906,161 | B2 |   | 6/2005  | Sakamoto et al. |
| 2002/0100550 | A1 |   | 8/2002  | Mahdi et al. |
| 2002/0194813 | A1 |   | 12/2002 | Virnelson et al. |
| 2003/0212197 | A1 | * | 11/2003 | Sakamoto et al. ........... 524/588 |
| 2004/0188016 | A1 |   | 9/2004  | Mahdi et al. |
| 2005/0192387 | A1 |   | 9/2005  | Williams et al. |

* cited by examiner

*Primary Examiner*—Marc S Zimmer
(74) *Attorney, Agent, or Firm*—Dominick G. Vicari (57) ABSTRACT

The invention relates to architectural elements possessing at least two components bonded together employing a silicone rubber composition of high stability and translucency, which is useful for application as a bedding sealant in the manufacture of such architectural elements as window assemblies, door assemblies, structural glazing, curtainwall applications, and the like.

46 Claims, 1 Drawing Sheet

FIG. 1

ARCHITECTURAL UNIT POSSESSING TRANSLUCENT SILICONE RUBBER COMPONENT

FIELD OF THE INVENTION

This invention is generally related to architectural elements possessing at least two components bonded together employing a silicone rubber composition of high stability and translucency.

BACKGROUND OF THE INVENTION

Insulating glass units (IGU) generally have two panels of glass separated by a spacer and require bedding glaze, sealant or adhesive to bond the glazing to structural elements comprising the unit. The two panels of glass are placed parallel to each other and sealed at their periphery such that the space between the panels, or the inner space, is completely enclosed. The panels are secured to the window frame assembly of the IGU by an adhesive or sealant that forms a "bedding" between the panels of glass and frame of the unit.

Various compositions and methods of glazing are known, e.g., back-bedding sealing is a method where the sash frame of the window frame assembly is placed horizontally on a back-bedding machine which provides a continuous bead of fluid back bedding sealant along the glazing leg of the IGU. In this method, the back bedding material creates a seal between IGU and the sash frame. Although additional equipment is required, this process allows the use of a variety of materials, including silicone sealants and adhesives that have advantageous performance characteristics.

Various types of sealants are currently used in the manufacture of insulated glass units including both curing and non-curing systems. Liquid polysulphides, polyurethanes and silicones represent curing systems, which are commonly used, while polybutylene-polyisoprene copolymer rubber based hot melt sealants are commonly used non-curing systems.

Liquid polysulphides, polyurethanes and silicones may be one component as well as two component systems. The two component systems comprise a base and a curing agent that are mixed just prior to application to the glass. Two component systems require a set mix ratio, two-part mixing equipment and cure time before the insulating glass units can be moved onto the next manufacturing stage.

Current two-part RTV silicone sealant compositions which are typically opaque, while effective due to the speed of cure still present some problems related to productivity since squeeze out is not invisible and requires clean up. Typically, opaque two-part RTV silicone compositions have one component that contains silanol-terminated diorganopolysiloxane and calcium carbonate filler and another component containing an alkyl-terminated diorganopolysiloxane, catalyst, cross-linker and adhesion promoter. Fumed silicas are not typically used in the component that contains the silanol terminated diorganopolysiloxane due to the tendency of the free silanol (—SiOH) groups on the fumed silica to interact with the silanol terminated polymer thereby causing the component to increase viscosity (structuring) during storage. Moreover, this structuring phenomenon limits the utility of fumed silica fillers in two-part silanol terminated diorganopolysiloxane based sealants.

As a result of this limitation a need therefore exists for translucent two-part RTV silicone rubber-forming compositions with improved stability providing rapid primerless adhesion, to a wide variety of substrates, e.g., window assembly, along with excellent physical properties.

SUMMARY OF THE INVENTION

An architectural element possessing at least two components bonded together or otherwise maintained in sealing relationship to each other employing a silicone rubber composition obtained by the curing of a mixture which comprises:
a) a first part comprising diorganopolysiloxane wherein the silicon atom at each polymer chain end is silanol terminated;
b) a second part comprising a condensation catalyst;
c) a crosslinker in the first and/or second part;
d) fumed silica having surface silanol groups treated with a capping agent, the fumed silica being present in the first and/or second part; and, optionally,
at least one additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, surfactant, solvent and biocide, the additional component being present in the first part and/or second part, whichever part(s) the component is compatible therewith.

The stable translucent silicone rubber component of the architectural element of the present invention can be used as a sealant, caulkant, bonding agent and/or adhesive in the assembly of the element. The silicone rubber exhibits high bond strength, in particular, a good balance between peeling bond strength and shearing bond strength, and therefore is particularly useful for application as a bedding sealant in the manufacture of such architectural elements as window assemblies, in particular insulated glass units, door assemblies, structural glazing, curtainwall applications, and the like.

DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

The typical window bedding glaze composition possesses the following properties: good adhesion and adhesive strength, low temperature flexibility, resistance to weathering (i.e., resistance to UV radiation), long shelf life and ease of application. In addition to these important features, a window bedding glaze composition is also expected to have sufficient green strength to provide proper stability to the seal between application and complete curing.

As used herein the expression "architectural element" denotes a prefabricated or manufactured unit used in building construction, e.g., a window, in particular, an insulated glass unit ("IGU"), a glass-paneled door, doors containing one or more windows, prefabricated windows, sliding doors with one or more windows, folding doors with one or more windows, curtainwall, shop glazing, structural glazing, skylight, light fixtures, and the like, in which a bonding, bedding glaze, sealant, caulking or adhesive composition is used to bond the glazing to structural elements comprising the architectural element.

As used herein the term "glazing" has its ordinary meaning, a meaning that is inclusive of glass and glass substitutes such as polyacrylates, specifically polymethylmethacrylate and polycarbonates and the like including but not limited to the transparent, translucent and opaque varieties of glazing.

As used herein the expression "bedding glaze," and terms "adhesive," "bonding," "sealant," or "caulking" composition encompasses or comprises the silicone rubber-forming composition of the present invention.

As used herein structural elements are materials used for construction of, e.g., buildings, window frames and window frame assembly, etc., which are made of those materials known in the art, e.g. wood, stone, brick, steel, aluminum, brass, iron, copper, concrete, plastic, plastic covered wood or metal and the like.

The term "compatible" as used herein means the optional component does not negatively or adversely affect in a material way the storage stability of the part in which it is contained and when contained in such part, the intended functions of the optional component is not negatively or adversely affected in a material way.

The phrase "green strength" as defined herein means a high modulus skin of sufficient strength that elements of a construction can be formed and will maintain the desired configuration even if handled, packaged, and shipped after relatively short times, without showing permanent deformation.

Figure 1:
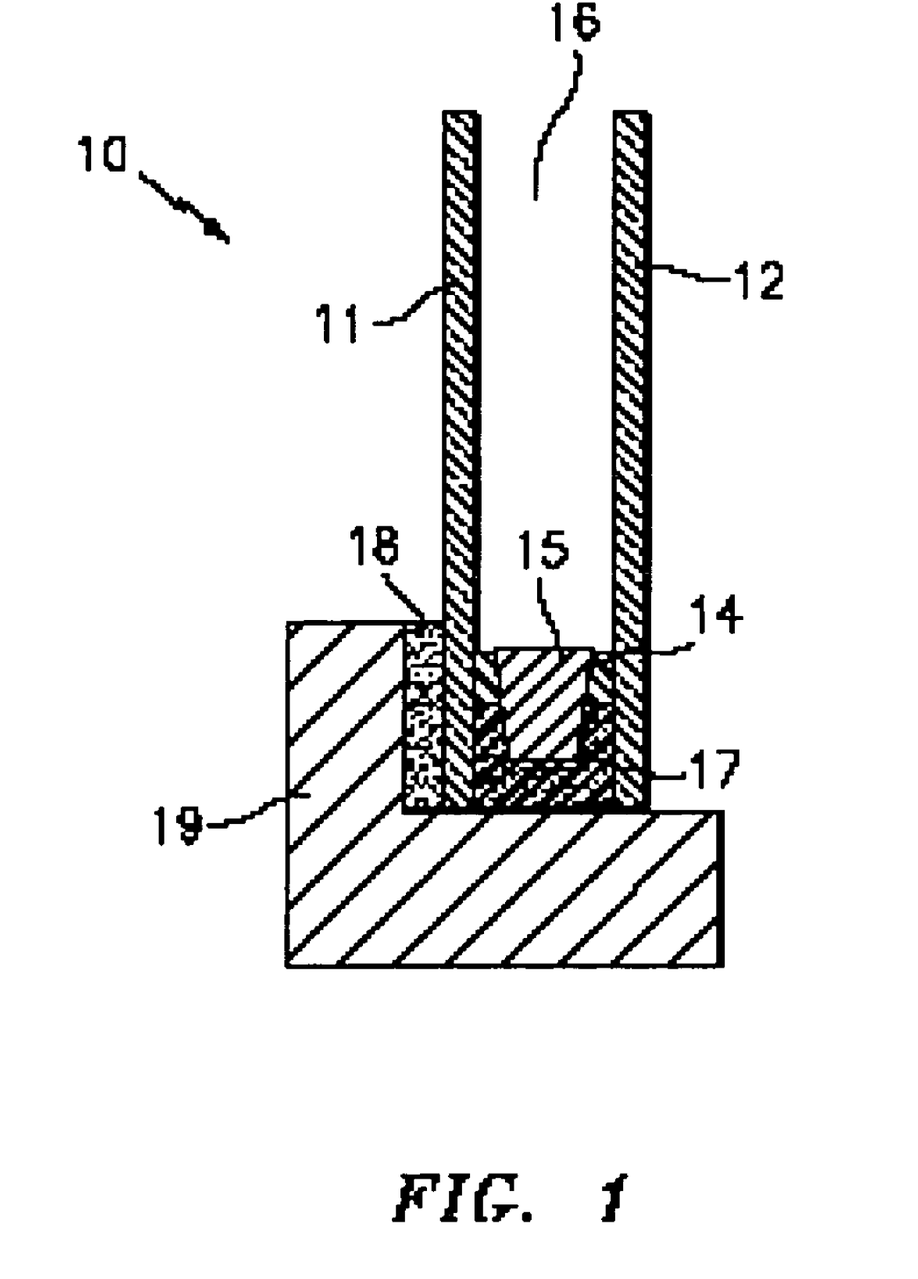
FIG. 1 is a sectional side view of an insulated glass unit (IGU) maintained in sealing relationship employing a two-part curable bedding glaze composition in accordance with the invention.

With reference to FIG. 1, insulated glass unit 10 includes glass sheets 11 and 12 maintained in spaced-apart relationship by a gas sealant assembly possessing a primary gas sealant member 14, continuous spacer member 15 and low gas-permeable sealant composition 17. Gas-impermeable space 16 between sheets 11 and 12 is filled with an insulating gas or gases such as argon. A two-part curable bedding glaze composition 18 prepared as hereinafter described is placed between glass sheet 11 and window frame assembly 19. Panes 11 and 12 can be fabricated from any of a variety of materials such as glass, e.g., clear float glass, annealed glass, tempered glass, solar glass, tinted glass, e.g., low energy glass, etc., acrylic resin and polycarbonate resin, and the like.

The utilization of translucent two-part curable bedding glaze composition 18 of the present invention in the foregoing insulated glass units provides for productivity gains in the manufacture of these units including rapid adhesion build and improved appearance since excess sealant around the glazing is not visible. Other benefits include long storage life as well as improved application rates of the individual two parts of the sealant in addition to providing the required performance attributes of typical bedding glaze sealants including adhesion, adhesive strength and elongation. As a result, the two-part curable bedding glaze composition 18 can be used as a sealant and/or adhesive because it exhibits high bond strength including a good balance between shearing bond strength and peeling bond strength, and therefore, in particular, holds promise for application as a bedding glaze sealant in the production of IGUs.

Primary sealant member 14 of the insulated glass unit 10 can be comprised of polymeric materials known in the art, for example, rubber base materials such as polyisobutylene, butyl rubber, polysulfide, EPDM rubber, nitrile rubber, and the like. Other useful materials include, polyisobutylene/polyisoprene copolymers, polyisobutylene polymers, brominated olefin polymers, copolymers of polisobutylene and para-methylstyrene, copolymers of polyisobutylene and brominated para-methylstyrene, butyl rubber-copolymer of isobutylene and isoprene, ethylene-propylene polymers, polysulfide polymers, polyurethane polymers, styrene butadiene polymers, and the like.

As indicated above, primary gas sealant member 14 can be fabricated from a material such as polyisobutylene which has very good sealing properties. A desiccant can be included in continuous spacer 15 in order to remove moisture from the insulating gas occupied space between glass panes 11 and 12. Useful desiccants are those that do not adsorb the insulating gas/gases filling the interior of the insulated glass unit.

The two-part curable bedding glaze composition 18 of the present invention is a stable translucent silicone sealant composition that provides rapid primerless bond strength by combining, i.e., admixing, the two-part curable composition as hereinafter more fully described. The two parts constituting the curable composition, respectively, the "first part" and the "second part," while separated from each other exhibit storage stability of an indefinite duration but once combined, undergo rapid cure to provide the silicone rubber herein.

The bedding glaze composition 18 of the present invention is comprised of a two-part room temperature vulcanizing (RTV) silicone rubber-forming composition. A general description of each of the components of the 2-part formulation are given as follows:

The silanol-terminated diorganopolysiloxane polymer (SDPS) of the two-part curable bedding glaze composition of the present invention is advantageously selected from amongst those of the general formula:

with the subscript a=2 and b equal to or greater than 1 and with the subscript c zero or positive where with the subscript x=0, 1 or 2 and the subscript y is either 0 or 1, subject to the limitation that x+y is less than or equal to 2, where $R^1$ and $R^2$ are independently chosen monovalent hydrocarbon radicals up to about 60 carbon atoms; where where $R^3$ and $R^4$ are independently chosen monovalent hydrocarbon radicals of up to about 60 carbon atoms; where where $R^5$ and $R^6$ are independently chosen monovalent hydrocarbon radicals of up to about 60 carbon atoms.

In one embodiment of the present invention, the level of incorporation of the diorganopolysiloxane wherein the silicon atom at each polymer chain end is silanol terminated ranges from about 5 weight percent to about 95 weight percent, and from about 35 weight percent to about 85 weight percent in another embodiment, and in yet another embodiment from about 50 weight percent to about 70 weight percent of the total composition.

According to one embodiment of the present invention, the viscosity of the diorganopolysiloxane wherein the silicon atom at each polymer chain end is silanol terminated is from about 1,000 to about 200,000 cps at 25° C.

The second part of the two-part curable bedding glaze composition 18 of the present invention comprises a condensation catalyst. The condensation catalyst can be any of those known to be useful for facilitating crosslinking in silicone rubber-forming compositions. The condensation catalyst may include metal and non-metal catalysts. Examples of the metal portion of the metal condensation catalysts useful in the present invention include tin, titanium, zirconium, lead, iron cobalt, antimony, manganese, bismuth and zinc compounds.

The tin compounds useful for facilitating crosslinking in silicone rubber-forming composition include: tin compounds such as dibutyltindilaurate, dibutyltindiacetate, dibutyltindimethoxide, tinoctoate, isobutyltintriceroate, dibutyltinoxide, dibutyltin bis-isooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate. In one embodiment, tin compounds and $(C_8H_{17})_2$ SnO dissolved in $(n-C_3H_9O)_4Si$ are used. In another embodiment, diorganotin bis β-diketonates are used. Other examples of tin compounds may be found in U.S. Pat. No. 5,213,899, U.S. Pat. No. 4,554,338, U.S. Pat. No. 4,956,436, and U.S. Pat. No. 5,489,479, the teachings of which are herewith and hereby specifically incorporated by reference. In yet another embodiment, chelated titanium compounds, for example, 1,3-propanedioxytitanium bis(ethylacetoacetate); di-isopropoxytitanium bis(ethylacetoacetate); and tetra-alkyl titanates, for example, tetra n-butyl titanate and tetra-isopropyl titanate, are used.

According to one embodiment of the present invention, the condensation catalyst is a metal catalyst. In another embodiment of the present invention, the metal condensation catalyst is selected from the group consisting of tin compounds, and in yet another embodiment of the present invention the condensation catalyst is dibutyltin bis-isooctylphthalate.

Other condensation catalyst known to be useful for facilitating crosslinking in silicone rubber-forming compositions include (i) amines such as bis(2,2'-dimethylamino)ethyl ether, trimethylamine, triethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethanolamine, triethylenediamine, pyridine, pyridine oxide and the like; (ii) strong bases such as alkali and alkaline earth metal hydroxides, alkoxides, and phenoxides; (iii) acidic metal salts of strong acids such as ferric chloride, stannous chloride, antimony trichloride, bismuth nitrate and chloride, potassium hydrogen sulfate and the like; (iv) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (v) alcoholates and phenolates of various metals such as $Ti(OR)_4$, $Sn(OR)_4$, $Sn(OR)_2$, $Al(OR)_3$, and the like, wherein R is alkyl or aryl of from 1 to about 18 carbon atoms, and reaction products of alcoholates with carboxylic acids, beta-diketones, and 2-(N,N-dialkylamino) alkanols, such as well known chelates of titanium obtained by this or equivalent procedures; (vi) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (vii) organometallic derivatives of tetravalent tin, trivalent and pentavalent As, Sb, and Bi, and metal carbonyls of iron and cobalt; and combinations thereof. In one specific embodiment organotin compounds that are dialkyltin salts of carboxylic acids, can include the non-limiting examples of dibutyltin diacetate, dibutyltin dilaureate, dibutyltin maleate, dilauryltin diacetate, dioctyltin diacetate, dibutyltin-bis(4-methylaminobenzoate), dibuytyltindilaurylmercaptide, dibutyltin-bis(6-methylaminocaproate), and the like, and combinations thereof. Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide) dibutyltin-bis(2-dimethylaminopentylate), dibutyltin dichloride, dioctyltin dichloride, and the like, and combinations thereof. In yet another embodiment, the condensation catalyst known to be useful for facilitating crosslinking in silicone rubber-forming compositions includes organic and inorganic acids, e.g., hydrochloric acid, sulfuric acid, phosphoric acid, acetic acid, stearic acid, substituted sulfonic acids and the like.

Accordingly, the level of incorporation of the condensation catalyst ranges from about 0.001 weight percent to about 5 weight percent in one embodiment, and from about 0.003 weight percent to about 2.0 weight percent and from about 0.005 weight percent to about 0.5 weight percent of the total composition in another embodiment.

In a typical formulation, the weight ratio of "first part" to "second part" is adjusted to provide optimal performance properties, and the weight ratio of the first part to second part can vary widely, as known in the art, from about 20:1 to about 1:20. According to one specific embodiment of the present invention, the weight ratio of the first part to second part is 10:1.

The first and second parts are typically mixed at 25° C. (room temperature); however, the temperature at which the first and second parts are mixed can vary widely from about 25° C. to 200° C. According to one embodiment of the present invention, the temperature at which the first and second parts are mixed is 25° C.

The organosilicon crosslinker of the present invention is a compound having one or more leaving groups (i.e., groups that can be easily hydrolyzed), for example, alkoxy, acetoxy, acetamido, ketoxime, benzamido and aminoxy.

The organosilicon crosslinker of two-part curable bedding glaze composition 18 where present can be in the first and/or second part, however, typically will be in the second part. Some of the useful crosslinkers of the present invention include tetra-N-propylsilicate (NPS), tetraethylorthosilicate, methylrimethoxysilane and similar alkyl substituted alkoxysilane compositions, methyltriacetoxysilane, dibutoxydiacetoxysilane, methylisopropoxydiacetoxysilane, methyloximinosilane and the like.

The alkylsilicate (crosslinker) of the present invention has the general formula:

where $R^{14}$, $R^{15}$, $R^{16}$ and $R^{17}$ are independently chosen monovalent hydrocarbon radicals up to about 60 carbon atoms.

According to one embodiment of the present invention, the level of incorporation of the organosilicon crosslinker ranges from about 0.01 weight percent to about 20 weight percent, and from about 0.3 weight percent to about 5 weight percent.

In yet another embodiment, the adhesion promoter ranges from about 0.5 weight percent to about 1.5 weight percent of the total composition.

In accordance with the invention, the two-part curable bedding glaze composition 18 of the present invention includes fumed silica. The fumed silica can be in the first and/or second part of two-part curable bedding glaze composition 18, however, typically will be in the first part. It is a component for reinforcement, i.e., increasing the mechanical strength of cured polysiloxane rubber composition. Fumed silicas are not typically used in the component (e.g., one component of a two-part RTV composition) that contains silanol-terminated diorganopolysiloxane because the free silanol (—SiOH) groups on the fumed silica interact with the silanol-terminated polymer causing the component to increase viscosity (structuring) during storage. However, the present invention provides a translucent two-part silanol terminated diorganopolysiloxane based composition utilizing hydrophobic fumed silica imparting unexpected stability.

The fumed silica is treated with a hydrophobizing agent until the desired percentage of silica surface silanol capping has occurred. In one embodiment of the invention, the silicas are treated with an organosilicon selected from the group consisting of silazanes, chlorosilanes, alkoxysilanes, siloxanes and/or polysiloxanes, acetoxysilanes, substituted silanols and mixtures thereof. In another embodiment of the invention, silica is treated with hexamethyldisilazane or the like so that trimethylsilyl groups are bound to silica surfaces although surface treatment with dimethyldichlorosilane, cyclic dimethylsiloxane, hydroxyl-containing dimethyloligosiloxane or the like is acceptable. A mixture of two or more hydrophobic silicas can also be used.

The treated fumed silica filler is hydrophobic silica, which can be used alone or in combination. The hydrophobic silicas are typically ones treated with organosilicon compounds having alkylsilyl groups. The fillers can also be treated with suitable dispersion auxiliaries, adhesion promoters or hydrophobizing agents.

The siloxanes and/or polysiloxanes used as hydrophobizing agents, which can be linear, cyclic or mixtures thereof, typically contain organic groups bonded to silicon. The organic groups can be alkyl, e.g. lower alkyl, alkenyl e.g. lower alkyl, aryl, aralkyl, alkarly, cycloalkyl or cycloalkenyl groups. Suitable groups are e.g. methyl, ethyl, propyl, butyl, isopropyl, phenyl, tolyl (e.g. o-tolyl, p-tolyl or m-tolyl), benzyl, vinyl, allyl, methallyl, cyclopentyl, cyclohexyl or cyclohexenyl groups. Generally, however, there are used methyl and/or phenyl groups with or without a portion of vinyl groups. Suitable siloxanes include for example hexamethylcyclotrisiloxane, octamethyl cyclotetrasiloxane, tetramethyltetravinylcyclotetrasiloxane, decamethylcyclopentasiloxane, hexamethyldisiloxane, sym.-tetramethyldivinylsiloxane, sym.-trimethyltriphenylcyclotrisiloxane, octamethyltrisiloxane, decamethyltetrasiloxane and other linear diorganopolysiloxanes, including diorganopolysiloxanes with hydroxy and end groups, such as 1,7-dihydroxyoctamethyltetrasilosane, 1,9-dihydroxydecamethylpentasiloxane and 1,11-dihydroxyduodecamethylhexasiloxane. Further usable siloxanes are 1,3,5,8-hexamethyldisiloxane, 1,3-divinyl-1,1,3,3-tetramethyldisiloxane and 1,3,5-trimethyl-1,3,5-triphenylcyclotrisiloxane.

As hydrophobizing agent there can be employed organosilicon compounds, e.g., organosilanes. Suitable organosilicon compounds for use in the present invention include methyltrichlorosilane, dimethyldichlorosilane, trimethylchlorosilane, methyltrimethoxysilane, dimethyldimethoxysilane, trimethylmethoxysilane, methyltriethoxysilane, dimethyldiethoxysilane, trimethylethoxysilane, methyltriacetoxysilane, dimethyldiacetoxysilane, trimethylacetoxysilane, octylmethyldichlorosilane, octyltrichlorosilane, octadecylmethyldichlorosilane, octadecyltrichlorosilane, vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane, vinyldimethylethoxysilane, hexamethyldisilazane, divinyltetramethyldisilazane, bis(3,3-trifluoropropyl)tetramethyldisilazane, octamethylcyclotetrasilazane, and trimethylsilanol. It is also possible to use any desired mixtures of organosilicon compounds. In one embodiment of the present invention the hydrophobizing agents are selected from the group consisting siloxanes and/or polysiloxanes, chlorosilanes, alkoxysilanes, disilazanes and mixtures thereof. In another embodiment of the present invention the hydrophobizing agent is a disilazane, e.g., hexamethyldisilazane.

Other suitable fillers include polymer particles, which may also be crosslinked, such as those of polystyrene, polycarbonate, polyethylene, polypropylene or polymethyl methacrylate, e.g., Agfaperl®. Also suitable are, in particular, organic and inorganic fillers having a primary particle size of from 0.01 to 300 nm. Examples of suitable fillers are clays and/or nanoclays, ceramic microspheres, glass bubbles, glass powder, glass nanoparticles, for example Monospher® (Merck), glass microparticles, for example Spheriglas® (Potters-Ballotini). Also suitable are organic and/or inorganic oxides and mixed oxides, in particular of the elements silicon, aluminum, magnesium, titanium and calcium. Examples of such fillers are silicon dioxide, in particular pyrogenic oxides, for example Aerosil® (Degussa), silicates, for example talc, pyrophyllite, wollastonite, aluminosilicates, for example feldspar or zeolites.

Further examples of treated fumed silicas for use in the present invention include commercially available treated silicas, such as from Degussa Corporation under the tradename AEROSIL, such as AEROSIL R8200, R9200, R812, R812S, R972, R974, R805, R202 and Cabot Corporation under the tradename CAB-O-SIL ND-TS, TS610 or TS710.

According to one embodiment of the present invention, the fumed silica has a BET specific surface area greater than about 10 $m^2/g$. In another embodiment of the present invention, the fumed silica has a BET specific surface area about 50 to about 400 $m^2/g$.

In one embodiment of the present invention, the fumed silica can be added in amounts from about 5 to about 80 weight percent of first part (a), and according to another embodiment the fumed silica can be present in amounts from about 10 to about 30 weight percent of first part (a).

Optionally, the first and/or second part of the curable two-part bedding glaze composition 18 can contain one or more additional ingredients, e.g., alkyl terminated diorganopolysiloxane, filler, UV stabilizer, antioxidant, adhesion promoter, cure accelerator, thixotropic agent, plasticizer, moisture scavenger, pigment, dye, surfactant, solvent and biocide, the additional component being present in the first part and/or second part, whichever part(s) the component is compatible therewith. Thus, e.g., alkyl terminated diorganopolysiloxane where present can be in the first and/or second part, filler, where present, can be in the first and/or second part; U.V. stabilizer where present, will ordinarily be in the first and/or second part; antioxidant, where present will ordinarily be in the first and/or second part; adhesion promoter, where present, will be in the first and/or second part; cure accelerator, where present, will be in the first and/or second part;

thixotropic agent, where present, will be included in the first and/or second part; plasticizer, where present, is in the first and/or second part; moisture scavenger, where present, will be in the first and/or second part; pigment, where present, can be in the first and/or second part; dye, where present, can be in the first and/or second part; surfactant, where present, can be in the first and/or second part; solvent, where present, can be in the first and/or second part; and, biocide, where present, will be incorporated in the first and/or second part.

The alkyl terminated diorganopolysiloxane polymer of the present invention is advantageously selected from amongst those of the general formula $$M''_e D''_f D'''_g$$

with the subscript e=2 and f equal to or greater than 1 and with the subscript g zero or positive where $$M''=R^7 R^8 R^9 SiO_{1/2};$$

where $R^7$, $R^8$ and $R^9$ are independently chosen monovalent hydrocarbon radicals up to about 60 carbon atoms; where $$D''=R^{10} R^{11} SiO_{2/2};$$

where $R^{10}$ and $R^{11}$ are independently chosen monovalent hydrocarbon radicals up to about 60 carbon atoms; where $$D'''=R^{12} R^{13} SiO_{2/2};$$

where $R^{12}$ and $R^{13}$ are independently chosen monovalent hydrocarbon radicals up to about 60 carbon atoms.

The level of incorporation of the diorganopolysiloxane wherein the silicon atom at each polymer chain end is alkyl terminated ranges from slightly above 0 weight percent to about 50 weight percent, and in one embodiment from about 5 weight percent to about 35 weight percent, and in another embodiment from about 10 weight percent to about 30 weight percent of the total composition.

According to one embodiment of the present invention, the viscosity of the diorganopolysiloxane wherein the silicon atom at each polymer chain end is alkyl terminated is from about 50 to about 200,000 cps at 25° C.

Two-part curable bedding glaze composition 18 of the present invention can also comprise an adhesion promoter. Suitable alkoxysilane adhesion promoters include n-2-aminoethyl-3-aminopropyltrimethoxysilane, n-2-aminoethyl-3-aminopropyltriethoxysilane, 1,3,5-tris(trimethoxysilylpropyl)isocyanurate, γ-aminopropyltriethoxysilane, γ-aminopropyltrimethoxysilane, bis-γ-trimethoxysilypropyl)amine, N-Phenyl-γ-aminopropyltrimethoxysilane, triaminofunctionaltrimethoxysilane, γ-aminopropylmethyldiethoxysilane, γ-aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl)ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, and n-ethyl-3-trimethoxysilyl-2-methylpropanamine and mixtures thereof.

In one embodiment of the present invention, the adhesion promoter is selected from the group consisting of n-2-aminoethyl-3-aminopropyltrimethoxysilane and 1,3,5-tris(trimethoxysilylpropyl)isocyanurate and mixtures thereof. In another embodiment of the invention the adhesion promoter is selected from the group consisting of γ-aminopropyltrimethoxysilane and 1,3,5-tris(trimethoxysilylpropyl)isocyanurate and mixtures thereof.

According to one embodiment of the present invention, the level of incorporation of the alkoxysilane (adhesion promoter) ranges from about 0.1 weight percent to about 20 weight percent, and from about 0.3 weight percent to about 10 weight percent. In yet another embodiment, the adhesion promoter ranges from about 0.5 weight percent to about 5 weight percent of the total composition.

Optional components comprise a non-ionic surfactant compound selected from the group of surfactants consisting of polyethylene glycol, polypropylene glycol, ethoxylated castor oil, oleic acid ethoxylate, alkylphenol ethoxylates, copolymers of ethylene oxide (EO) and propylene oxide (PO) and copolymers of silicones and polyethers (silicone polyether copolymers), copolymers of silicones and copolymers of ethylene oxide and propylene oxide and mixtures thereof in an amount ranging from 0 weight percent to about 20 weight percent, more preferably from about 0.1 weight percent to about 5 weight percent, and most preferably from about 0.2 weight percent to about 1 weight percent of the total composition. The use of silicone polyether as a non-ionic surfactant is described in U.S. Pat. No. 5,744,703 the teachings of which are herewith and hereby specifically incorporated by reference.

While low gas-permeable sealant composition 17 of insulated glass unit 10 can be any of the sealant compositions heretofore employed in the construction of insulated glass units, it can be advantageous to employ any of the low gas permeable sealant compositions utilized in the insulated glass units disclosed in copending, commonly assigned U.S. patent application Ser. Nos. 11/283,382 filed Nov. 18, 2005; 11/328,384 filed Jan. 9, 2006; 11/345,463 filed Feb. 1, 2006; 11/344,983 filed Feb. 1, 2006; 11/336,950 filed Jan. 20, 2006, the entire contents of which are incorporated by reference herein.

In accordance with Ser. No. 11/283,382, low gas-permeable sealant composition 17 can be obtained from the curing of a curable composition comprising (a) diorganopolysiloxane; (b) at least one polymer having a permeability to said gas that is less than the permeability of diorganopolysiloxane polymer; (c) cross-linker; (d) catalyst for the cross-linker reaction; and, optionally, (e) at least one filler, adhesion promoter, and/or non-ionic surfactant.

Examples of suitable diorganopolysiloxanes (a) include any of those described herein in amounts ranging from about 50 to about 99 weight percent of the total composition. Suitable polymers (b) include low density polyethylene (LDPE), very low density polyethylene (VLDPE), linear low density polyethylene (LLDPE), high density polyethylene (HDPE), and mixtures thereof in amounts ranging from about 1 to about 50 weight percent of the total composition. Suitable cross-linkers (c) include any of the alkylsilicates described herein in amounts ranging about 0.1 weight percent to about 20 weight percent of the total composition. Suitable catalysts (d) include any of those described herein in amounts ranging from about 0.005 weight percent to about 1 weight percent of the total composition. Suitable optional components (e) include filers such as clays, nano-clays, organo-clays, ground calcium carbonate, precipitated calcium carbonate, colloidal calcium carbonate, calcium carbonate treated with compounds stearate or stearic acid; fumed silica, precipitated silica, silica gels, hydrophobized silicas, hydrophilic silica gels; crushed quartz, ground quartz, alumina, aluminum hydroxide, titanium hydroxide, clay, kaolin, bentonite montmorillonite, diatomaceous earth, iron oxide, carbon black and graphite, talc, mica, and mixtures thereof in the range from 0 to about 80 weight percent, adhesion promoters and non-ionic surfactants such as any of those described herein. Adhesion promoters can generally be present in an amount from about 0.5 weight percent to about 20 weight percent of the total composition. Non-ionic surfactants can generally be utilized in amounts of up to about 10 weight percent of the total composition.

In accordance with Ser. No. 11/328,384, low gas-permeable sealant composition 17 can be obtained from the curing of a curable composition comprising (a) at least one silanol-terminated diorganopolysiloxane; (b) at least one crosslinker for the silanol-terminated diorganopolysiloxane(s); (c) at least one catalyst for the crosslinking reaction; (d) at least one organic nanoclay; and, optionally, (e) at least one solid polymer having a permeability to gas that is less than the permeability of the crosslinked diorganopolysiloxane(s). Silanol-terminated diorganopolysiloxane (a), crosslinker (b), catalyst (c) and solid polymer (e) can be any of those components identified above and in the amounts stated therein. Organic nanoclay (d) can be selected from the group consisting of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite, kaolinite and, mixtures thereof modified with tertiary amine compound $R^3R^4R^5N$ and/or quarternary ammonium compound $R^6R^7R^8N^+X^-$ wherein $R^3$, $R^4$, $R^5$, $R^6$, $R^7$ and $R^8$ each independently is an alkyl, alkenyl or alkoxy silane group of up to 60 carbon atoms and X is an anion. Organic nanoclay (d) can be present at a level of about 0.1 to about 50 weight percent of the total composition.

In accordance with Ser. No. 11/345,463, low gas-permeable sealant composition 17 can be obtained from the curing of a moisture-curable silylated resin-containing composition comprising (a) moisture-curable silylated resin which upon curing, provides cured resin exhibiting permeability to gas; (b) at least one other polymer having a permeability to gas that is less than the permeability of cured resin (a); and, optionally, (c) at least one additional component selected from the group consisting of filler, adhesion promoter, catalyst, surfactant, UV stabilizer, antioxidant, cure accelerator, thixotropic agent, moisture scavenger, pigment, dye, solvent and biocide. Suitable moisture-curable silylated resins (a) include (i) silylated resin obtained from the reaction of isocyanate-terminated polyurethane prepolymer with active hydrogen-containing organofunctional silane; (ii) silylated resin obtained from the reaction of hydroxyl-terminated polyurethane prepolymer with isocyanatosilane; and, (iii) silylated polymer obtained from the reaction of polyol with isocyanatosilane in an amount that ranges from about 1 to about 99 weight percent of the total composition. Examples of suitable polymer (b) include any of those previously mentioned and in the amounts stated therein. Suitable optional components (c) include any of those previously mentioned in amounts from about 0.1 to about 80 weight percent of the total composition. Suitable adhesion promoters and non-ionic surfactants such as any of those described herein and in the amounts herein.

In accordance with Ser. No. 11/344,983, low gas-permeable sealant composition 17 can be obtained from the curing of, moisture-curable silylated resin-containing composition comprising (a) moisture-curable silylated resin, which upon curing, provides a cured resin exhibiting permeability to gas; (b) at least one organic nanoclay; and, optionally, (c) at least one solid polymer having a permeability to gas that is less than the permeability of the cured resin (a). Suitable moisture-curable silylated resins (a) include any of the previously mentioned and in the amounts stated above. Suitable organic nanoclays include any of those previously mentioned ranging in amounts from about 0.1 to about 50 weight percent of the total composition. Examples of suitable polymer (c) include low density polyethylene, very low density polyethylene, linear low density polyethylene, high density polyethylene, and mixtures thereof in an amount that from about 0 to about 50 weight percent of the total composition.

In accordance with Ser. No. 11/344,983, low gas-permeable sealant composition 17 can be obtained from the curing of a curable sealant composition comprising (a) at least one silanol-terminated diorganopolysiloxane; (b) at least one crosslinker for the silanol-terminated diorganopolysiloxane(s); (c) at least one catalyst for the crosslinking reaction; (d) a gas barrier enhancing amount of at least one inorganic-organic nanocomposite; and, optionally, (e) at least one solid polymer having a permeability to gas that is less than the permeability of the crosslinked diorganopolysiloxane(s). Examples of suitable diorganopolysiloxanes (a) include any of those described herein in amounts that range from about 50 weight percent to about 99 weight percent of the total composition. Suitable cross-linkers (b) include any of the alkylsilicates described herein in amounts that range from about 0.1 weight percent to about 10 weight percent of the total composition. Suitable catalysts (c) include any of those described herein in amounts that range from about 0.001 weight percent to about 1 weight percent of the total composition. Suitable inorganic-organic nanocomposite include those with an inorganic component which is a layered inorganic nanoparticulate and at least one organic component which is a quaternary ammonium organopolysiloxane in an amount that ranges range from 0.1 to about 50 weight percent of the total composition. Examples of suitable polymer (e) include those previously mentioned and in the amounts stated above.

Furthermore, the compositions of the present invention can be prepared using either batch or continuous modes of manufacture. Preferably, the ingredients such as silicone polymer, filler, cure catalyst, crosslinker, adhesion promoter, plasticizers, process aids, and other additives are combined in a continuous compounding extruder to produce the desired sealant composition. Both the "first part (a)" and the "second part (b)" are prepared in this manner. The continuous compounding extruder can be any continuous compounding extruder such as the twin screw Werner-Pfleiderer extruder, or a Buss, or P. B. Kokneader extruder.

In the broadest conception of the present invention, all the ingredients may be mixed in the continuous compounding extruder, that is silicone polymer, filler, plasticizer, a condensation catalyst and an adhesion promoter, etc. In such a process, which is continuous, the extruder is operated at a range of 20° to 200° C., but more preferably in the range of 25° to 50° C. and the extruder is operated at a partial vacuum so as to remove volatiles during the mixing process.

The following ingredients, as described herein below, were used to prepare Examples 1, 2, 3 and 4.

Polymer 1 is a mixture of polydimethylsiloxanes end-blocked with hydroxyl groups and having an overall viscosity of approximately 10,000 cps (available from General Electric Advanced Materials).

Filler 1 is octamethylcyclotetrasiloxane and hexamethyldisilazane treated fumed silica filler having a surface area of 160±25 $m^2/g$ (manufactured by General Electric Advanced Materials).

Filler 2 is hexamethyldisilazane treated fumed silica having a surface area of 160±25 m²/g available from Degussa as Aerosil R8200 Hydrophobic Fumed Silica.

Plasticizer is polydimethylsiloxanes endblocked with trimethylsilyl groups and having a viscosity of approximately 100 cps (available from General Electric Advanced Materials).

Rheology additive is polyalkyleneoxide modified organosilicone co-polymer having a viscosity of about 100 to about 3000 centipoise at 25° C. (available from General Electric Advanced Materials).

Polymer 2 is a polydimethylsiloxanes endblocked with trimethylsilyl groups and having a viscosity of approximately 10,000 cps (available from General Electric Advanced Materials).

Filler 3 is octamethylcyclotetrasiloxane treated fumed silica filler with a surface area of approximately 200±20 m²/g (manufactured by General Electric Advanced Materials).

Adhesion promoter 1 is aminoethylaminopropyltrimethoxysilane (available from General Electric Advanced Materials as Silquest A-1120 silane).

Adhesion promoter 2 is 1,3,5-tris(trimethoxysilylpropyl) isocyanurate (available from General Electric Advanced Materials as A-Link 597 silane).

Adhesion promoter 3 is gamma-aminopropyltrimethoxysilane (available from General Electric Advanced Materials as Silquest A-1110 silane).

Crosslinker is tetra-N-propylsilicate (NPS) (available from Degussa).

Catalyst is dibutyltin bis-isooctylphthalate (available from General Electric Advanced Materials).

EXAMPLE 1 AND 2

Examples 1 and 2 illustrate a first part preparation of a translucent fumed silica/silanol terminated polymer based two-part composition.

The ingredients used to prepare Examples 1 and 2 are displayed in Table 1.

TABLE 1

| Ingredients (weight %) | Example 1 | Example 2 |
|---|---|---|
| Polymer 1 | 68 | 68 |
| Filler 1 | 20 | — |
| Filler 2 | — | 20 |
| Plasticizer | 12 | 12 |

The stability (rate of increase in viscosity) of Examples 1 and 2 was determined by storing them in disposable polyethylene cartridges (Semco #250-06, 6 fluid oz. capacity) and measuring over time the Application Rates using WPSTM test E-56 at a temperature of 73° F. and relative humidity (RH) of 50%. In all instances, the Application Rate data was generated using the Semco #250-06 cartridge with its corresponding plunger and a 250 #440 Semco nozzle having an orifice of 0.125 inches. The formulations were extruded using a sealant gun and compressed air or nitrogen at 90 psi. The reported Application Rate value was the weight of the formulation that was extruded in 1 minute. The results are presented in Table 2.

TABLE 2

| Time | Example 1 (Application Rate in grams/minute) | Example 2 (Application Rate in grams/minute) |
|---|---|---|
| 7 days | 31 | 617 |
| 14 days | 0 | 626 |
| 21 days | 0 | 554 |
| 28 days | 0 | 566 |
| 14 months | 0 | 162 |

The results of Examples 1 and 2 WPSTM test E-56 are presented in Table 2. Example 1 demonstrated typical thickening effect (structuring) due to the interaction of the free silanol groups on the fumed silica with the silanol terminated polymer resulting in an increase in viscosity. Accordingly, a very low Application Rate of 31 for Example 1 was observed at 7 days of aging. Example 1 was unable to be extruded at 14 days or thereafter. Significantly, Example 2 demonstrated exceptional Application Rates from 7 days to 28 days. In addition, although the application rate had dropped at 14 months, Example 2 was still extrudable enabling this formulation to be converted into a practical (stable) two-part translucent fumed silica/silanol terminated polymer based sealant.

The PDMS, Filler 2 and plasticizer of Example 2 along with a rheology additive were used to prepare the first part of the two-part translucent sealant compositions of Examples 3 and 4. See Table 3.

TABLE 3

| | Example 3 (Two-part sealant composition) | Example 4 (Two-part sealant composition) |
|---|---|---|
| Example 2 (First part of two-part sealant) Ingredients (weight %) | | |
| Polymer 1 | 63.3 | 63.3 |
| Filler 2 | 18 | 18 |
| Plasticizer | 18 | 18 |
| Rheology additive | 0.7 | 0.7 |
| Second Part of two-part sealant Ingredients (weight %) | | |
| Polymer 2 | 55.45 | 55.20 |
| Filler 3 | 12 | 12 |
| Adhesion promoter 1 | 16 | — |
| Adhesion promoter 2 | 4 | 4 |
| Adhesion promoter 3 | — | 16 |
| NPS | 11.6 | 11.6 |
| Catalyst | 0.95 | 1.2 |

The first and second part of Examples 3 and 4 were individually mixed at a 10:1 (first part/second part) weight ratio to provide the physical properties at full cure (7 days) listed in Table 4. The physical properties of Examples 3 and 4 were tested as per the ASTM test methods listed in the Table 4. The translucency of the sealants was determined by measuring the transmittance (%) of a sheet of sealant made as per ASTM D412 (cured for 7 days) using a BYK Gardner Haze-gard Plus instrument.

TABLE 4

| | Example 3 | Example 4 |
|---|---|---|
| Tensile (psi), ASTM D412 | 214 | 191 |

TABLE 4-continued

|  | Example 3 | Example 4 |
|---|---|---|
| Elongation (%), ASTM D412 | 236 | 213 |
| 100% Modulus (psi), ASTM D412 | 87 | 95 |
| Shore A Hardness, ASTM D2240 | 27 | 29 |
| Transmittance (%) | 70 | 72 |

In addition to physical properties, Examples 3 and 4 were tested for their adhesion strength build properties. This strength build data of Example 3 and 4 is presented in Table 5 and was obtained using lap shear adhesion as measured by WPSTM test C-1221. In all instances, the lap shear adhesion data was generated using test panels comprising glass-glass or vinyl-glass combinations. The panels were prepared using 1 inch wide coupons overlapping ½ inch using 1/16 inch of sealant in a glass to glass or vinyl to glass configuration. The samples were cured under 50% RH and 73° F.

TABLE 5

|  | Example 3 | | Example 4 | |
|---|---|---|---|---|
| Time | Glass (psi) | Vinyl (psi) | Glass (psi) | Vinyl (psi) |
| 30 min. | 20 | 3 | 10 | 5 |
| 60 min. | 44 | 6 | 34 | 8 |
| 180 min. | 81 | 11 | 65 | 17 |
| 360 min. | 81 | 31 | 86 | 36 |
| 1 day | 113 | 97 | 108 | 73 |
| 7 days | 166 | 101 | 151 | 109 |

The adhesion strength build was measured by lap shear as determined by the following procedure: The surfaces of all substrates (glass & vinyl) were cleaned prior to preparation of the lap shear test coupon. All substrates were cleaned using a soap (Ajax® Dish Liquid) and water solution. After cleaning, the surfaces of the substrates were immediately wiped dry with a clean Kimwipe®. The test specimens measuring 1 inch by 3 inches, were prepared using a jig assembly in order to ensure the reproducibility of the bond line thickness (1/16 of an inch) and overlap (0.50 inches) of the lap shear test specimen. The test specimens were cured under standard conditions (25° C. and 50% Relative Humidity) for the time specified. Performance measurements were obtained using a standard tensile tester. Each test specimen was pulled (at a crosshead speed of 0.5 in. per minute) to failure. The lap shear strength (psi) was calculated in accordance with the following formula:

$$\text{Lap Shear Strength }(psi) = \frac{\text{Peak load (lb.)}}{\text{Bonded Area }(sq.\ in.)}$$

In addition to physical properties, Examples 3 and 4 of the present invention also demonstrated excellent primerless adhesion strength build as shown in Table 5, in particular Examples 3 and 4 demonstrated excellent adhesion strength build within 60 minutes between glass and glass, as well as vinyl (plastic) and glass.

While the process of the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. An insulated glass unit comprising:
   at least two sheets of glass or other functionally equivalent material;
   a curable bedding glaze, the bedding glaze employing a silicone rubber composition obtained by the curing of a mixture which comprises:
      a) a first part comprising diorganopolysiloxane wherein the silicon atom at each polymer chain end is silanol terminated;
      b) a second part comprising a condensation catalyst;
      c) a crosslinker in the first and/or second part;
      d) fumed silica having surface silanol groups treated with a capping agent, the fumed silica being present in the first and/or second part; and, optionally,
      e) at least one additional component selected from the group consisting of alkyl-terminated diorganopolysiloxane, filler, UV stabilizer, antioxidant, adhesion promoter, cure accelerator, thixotropic agent, plasticizer, moisture scavenger, pigment, dye, surfactant, solvent and biocide, the additional component being present in the first part and/or second part, whichever part(s) the component is compatible therewith,
   the first part and second part following their combination curing to provide a silicone rubber;
   a primary gas sealant member fabricated from at least one polymeric material selected from the group consisting of polyisobutylene, butyl rubber, polysulfide, EPDM rubber, nitrile rubber, polyisobutylene/polyisoprene copolymers, polyisobutylene polymers, brominated olefin polymers, copolymers of polisobutylene, copolymers of para-methylstyrene, copolymers of polyisobutylene, brominated para-methylstyrene, butyl rubber-copolymer of isobutylene, butyl rubber-copolymer of isoprene, ethylene-propylene polymers, polysulfide polymers, polyurethane polymers, and styrene butadiene polymers; and
   a low gas-permeable sealant composition which is at least one member selected from the comprising
      a sealant composition obtained from the curing of a curable composition comprising (a) diorganopolysiloxane; (b) at least one polymer having a permeability to gas that is less than the permeability of diorganopolysiloxane polymer (a); (c) cross-linker; (d) catalyst for the cross-linker reaction; and, optionally, (e) at least one filler, adhesion promoter, and/or non-ionic surfactant;
      sealant composition obtained from the curing of a curable composition comprising (a) at least one silanol-terminated diorganopolysiloxane; (b) at least one crosslinker for the silanol-terminated diorganopolysiloxane(s); (c) at least one catalyst for the crosslinking reaction; (d) at least one organic nanoclay; and, optionally, (e) at least one solid polymer having a permeability to gas that is less than the permeability of the crosslinked diorganopolysiloxane(s);
      sealant composition obtained from the curing of, moisture-curable silylated resin-containing composition comprising (a) moisture-curable silylated resin, which upon curing, provides cured resin, exhibiting permeability to gas; and, (b) at least one other polymer having a permeability to gas that is less than the permeability of cured resin (a), and, optionally, (c) at least one additional component selected from the group consisting of filler, adhesion promoter, catalyst, surfactant, UV stabilizer, antioxidant, cure accelerator, thixotropic agent, moisture scavenger, pigment, dye, solvent and biocide;

sealant composition obtained from the curing of, moisture-curable silylated resin-containing composition comprising (a) moisture-curable silylated resin, which upon curing, provides a cured resin exhibiting permeability to gas; (b) at least one organic nanoclay; and, optionally, (c) at least one solid polymer having a permeability to gas that is less than the permeability of the cured resin (a); and sealant composition obtained from the curing of a curable sealant composition comprising (a) at least one silanol-terminated diorganopolysiloxane; (b) at least one crosslinker for the silanol-terminated diorganopolysiloxane(s); (c) at least one catalyst for the crosslinking reaction; (d) a gas barrier enhancing amount of at least one inorganic-organic nanocomposite; and, optionally, (e) at least one solid polymer having a permeability to gas that is less than the permeability of the crosslinked diorganopolysiloxane(s).

2. The insulated glass unit of claim 1 wherein the silanol-terminated diorganopolysiloxane is of the general formula:

$M_a D_b D'_c$ wherein a is 2, b is equal to or greater than 1 and c is zero or a positive value where $M=(HO)_{3-x-y}R^1_x R^2_y SiO_{1/2}$; with the subscript x being 0, 1 or 2 and the subscript y being either 0 or 1, subject to the limitation that x+y is less than or equal to 2, where $R^1$ and $R^2$ are independently chosen monovalent hydrocarbon radicals up to about 60 carbon atoms; where $D=R^3 R^4 SiO_{1/2}$;

where $R^3$ and $R^4$ are independently chosen monovalent hydrocarbon radicals up to about 60 carbon atoms; where $D'=R^5 R^6 SiO_{2/2}$;

where $R^5$ and $R^6$ are independently chosen monovalent hydrocarbon radicals of up to about 60 carbon atoms.

3. The insulated glass unit of claim 1 wherein the silanol-terminated diorganopolysiloxane ranges from about 5 weight percent to about 95 weight percent of the total composition.

4. The insulated glass unit of claim 1 wherein the silanol-terminated diorganopolysiloxane ranges from about 35 weight percent to about 85 weight percent of the total composition.

5. The insulated glass unit of claim 1 wherein the silanol-terminated diorganopolysiloxane ranges from about 50 weight percent to about 70 weight percent of the total composition.

6. The insulated glass unit of claim 1 wherein the silanol-terminated diorganopolysiloxane possesses a viscosity of from about 1,000 to about 200,000 cps at 25° C.

7. The insulated glass unit of claim 1 wherein the capping agent is selected from the group consisting of silazanes, chlorosilanes, alkoxysilanes, siloxanes and/or polysiloxanes, acetoxysilanes, substituted silanols and mixtures thereof.

8. The insulated glass unit of claim 1 wherein the capping agent is selected from the group consisting of hexamethylcyclotrisiloxane, octamethyl cyclotetrasiloxane, tetramethyltetravinylcyclotetrasiloxane, decamethylcyclopentasiloxane, hexamethyldisiloxane, sym.-tetramethyldivinylsiloxane, sym.-trimethyltriphenylcyclotrisiloxane, octamethylcyclotetrasiloxane, octamethyltrisiloxane, decamethyltetrasiloxane and other linear diorganopolysiloxanes, 1,7-dihydroxyoctamethyltetrasilosane, 1,9-dihydroxydecamethylpentasiloxane and 1,11-dihydroxyduodecamethylhexasiloxane. Further usable siloxanes are 1,3,5,8-hexamethyldisiloxane, 1,3-divinyl-1,1,3,3-tetramethyldisiloxane and 1,3,5-trimethyl-1,3,5-triphenylcyclotrisiloxane and mixtures thereof.

9. The insulated glass unit of claim 8 wherein the capping agent is selected from the group consisting of methyltrichlorosilane, dimethyldichlorosilane, trimethylchlorosilane, methyltrimethoxysilane, dimethyldimethoxysilane, trimethylmethoxysilane, methyltriethoxysilane, dimethyldiethoxysilane, trimethylethoxysilane, methyltriacetoxysilane, dimethyldiacetoxysilane, trimethylacetoxysilane, octylmethyldichlorosilane, octyltrichlorosilane, octadecylmethyldichlorosilane, octadecyltrichlorosilane, vinyltrichlorosilane, vinylmethyldichlorosilane, vinyldimethylehlorosilane, vinyltrimethoxysilane, vinylmethyldimethoxysilane, vinyldimethylmethoxysilane, vinyltriethoxysilane, vinylmethyldiethoxysilane, vinyldimethylethoxysilane, hexamethyldisilazane, divinyltetramethyldisilazane, bis(3,3-trifluoropropyl)tetramethyldisilazane, octamethylcyclotetrasilazane, and trimethylsilanol and mixtures thereof.

10. The insulated glass unit of claim 1 wherein the capping agent is hexamethyldisilazane.

11. The insulated glass unit of claim 1 wherein the fumed silica has a BET specific surface area greater than about 10 $m^2/g$.

12. The insulated glass unit of claim 11 wherein fumed silica has a BET from about 50 to about 400 $m^2/g$.

13. The insulated glass unit of claim 1 wherein the fumed silica ranges from about 5 to about 80 weight percent of first part (a).

14. The insulated glass unit of claim 13 wherein the fumed silica ranges from about 10 to about 30 weight percent of first part (a).

15. The insulated glass unit of claim 1 wherein the crosslinker has at least one leaving group selected from the group consisting of alkoxy, acetoxy, acetamido, ketoxime, benzamido, aminoxy and mixtures thereof.

16. The insulated glass unit of claim 1 wherein the crosslinker is an alkylsilicate.

17. The insulated glass unit of claim 16 wherein the alkylsilicate has the general formula:

$(R^{14}O)(R^{15}O)(R^{16}O)(R^{17}O)Si$ where $R^{14}$, $R^{15}$, $R^{16}$ and $R^{17}$ are independently chosen monovalent hydrocarbon radicals up to about 60 carbon atoms.

18. The insulated glass unit of claim 1 wherein the crosslinker is selected from the group consisting of tetra-N-propylsilicate, tetraethylorthosilicate, methytrimethoxysilane, methyltriacetoxysilane, dibutoxydiacetoxysilane, methylisopropoxydiacetoxysilane, methyloximinosilane and mixtures thereof.

19. The insulated glass unit of claim 16 wherein the alkylsilicate ranges from about 0.01 to about 20 weight percent of the total composition.

20. The insulated glass unit of claim 19 wherein the alkylsilicate ranges from about 0.3 to about 5 weight percent of the total composition.

21. The insulated glass unit of claim 20 wherein the alkylsilicate ranges from about 0.5 to about 1.5 weight percent of the total composition.

22. The insulated glass unit of claim 1 wherein the condensation catalyst is selected from the group consisting of metal and non-metal catalysts.

23. The insulated glass unit of claim 22 wherein the condensation catalyst is selected from the group consisting of tin, titanium, zirconium, lead, iron cobalt, antimony, manganese, bismuth and zinc compounds.

24. The insulated glass unit of claim 23 wherein the condensation catalyst is selected from the group consisting of dibutyltindilaurate, dibutyltindiacetate, dibutyltindimethoxide, tinoctoate, isobutyltintriceroate, dibutyltinoxide, dibutyltin bis-isooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, and tinbutyrate.

25. The insulated glass unit of claim 24 wherein the condensation catalyst is selected from the group consisting of diorganotin bis β-diketonates.

26. The insulated glass unit of claim 22 wherein the condensation catalyst is selected from the group consisting of 1,3-propanedioxytitanium bis(ethylacetoacetate), di-isopropoxytitanium bis(ethylacetoacetate), tetra n-butyl titanate, tetra-isopropyl titanate, and mixtures thereof.

27. The insulated glass unit of claim 1 wherein the alkyl terminated diorganopolysiloxane has the general formula:

with the subscript e=2 and f equal to or greater than 1 and with the subscript g zero or positive where where $R^7$, $R^8$ and $R^9$ are independently chosen monovalent hydrocarbon radicals up to about 60 carbon atoms; where where $R^{10}$ and $R^{11}$ are independently chosen monovalent hydrocarbon radicals up to about 60 carbon atoms; where where $R^{12}$ and $R^{13}$ are independently chosen monovalent hydrocarbon radicals up to about 60 carbon atoms.

28. The insulated glass unit of claim 27 wherein the alkyl terminated diorganopolysiloxane ranges from 0 weight percent to about 50 weight percent of the total composition.

29. The insulated glass unit of claim 28 wherein alkyl terminated diorganopolysiloxane ranges from about 5 weight percent to about 35 weight percent of the total composition.

30. The insulated glass unit of claim 29 wherein alkyl terminated diorganopolysiloxane ranges from about 10 weight percent to about 30 weight percent of the total composition.

31. The insulated glass unit of claim 27 wherein the alkyl terminated diorganopolysiloxane possesses a viscosity of from about 50 to about 200,000 cps at 25° C.

32. The insulated glass unit of claim 1 wherein alkyl terminated diorganopolysiloxane, where present is in the first and/or second part, filler, where present, is in the first and/or second part; U.V. stabilizer, where present, is in the first and/or second part; antioxidant, where present, is in the first and/or second part; adhesion promoter, where present, is in the first and/or second part; cure accelerator, where present, is in the first and/or second part; thixotropic agent, where present, is in the first and/or second part; moisture scavenger, where present, is in the first and/or second part; pigment, where present, is in the first and/or second part; dye, where present, is in the first and/or second part; surfactant, where present, is in the first and/or second part; solvent, where present is in the first and/or second part; and, biocide, where present, is in the first and/or second part.

33. The insulated glass unit of claim 1 wherein the adhesion promoter is selected from the group consisting of n-2-aminoethyl-3-aminopropyltrimethoxysilane, 1,3,5-tris(trimethoxysilylpropyl)isocyanurate, n-2-aminoethyl-3-aminopropyltriethoxysilane, γ-aminopropyltriethoxysilane, γ-aminopropyltrimethoxysilane, bis-γ-trimethoxysilylpropyl) amine, N-Phenyl-γ-aminopropyltrimethoxysilane, triaminofunctionaltrimethoxysilane, γ-aminopropylmethyldiethoxysilane, γ- aminopropylmethyldiethoxysilane, methacryloxypropyltrimethoxysilane, methylaminopropyltrimethoxysilane, γ-glycidoxypropylethyldimethoxysilane, γ-glycidoxypropyltrimethoxysilane, γ-glycidoxyethyltrimethoxysilane, β-(3,4-epoxycyclohexyl)propyltrimethoxysilane, β-(3,4-epoxycyclohexyl) ethylmethyldimethoxysilane, isocyanatopropyltriethoxysilane, isocyanatopropylmethyldimethoxysilane, β-cyanoethyltrimethoxysilane, γ-acryloxypropyltrimethoxysilane, γ-methacryloxypropylmethyldimethoxysilane, 4-amino-3,3,-dimethylbutyltrimethoxysilane, n-ethyl-3-trimethoxysilyl-2-methylpropanamine and mixtures thereof.

34. The insulated glass unit of claim 33 wherein the adhesion promoter is selected from the group consisting of n-2-aminoethyl-3-aminopropyltrimethoxysilane and 1,3,5-tris(trimethoxysilylpropyl)isocyanurate and mixtures thereof.

35. The insulated glass unit of claim 34 wherein the adhesion promoter is selected from the group consisiting of γ-aminopropyltrimethoxysilane and 1,3,5-tris(trimethoxysilylpropyl)isocyanurate and mixtures thereof.

36. The insulated glass unit of claim 1 wherein the surfactant is a non-ionic surfactant selected from the group of surfactants consisting of polyethylene glycol, polypropylene glycol, ethoxylated castor oil, oleic acid ethoxylate, alkylphenol ethoxylates, copolymers of ethylene oxide and propylene oxide and copolymers of silicones and polyethers, copolymers of silicones and copolymers of ethylene oxide and propylene oxide and mixtures thereof in an amount ranging from 0 weight percent to about 20 weight percent of the total composition.

37. The insulated glass unit of claim 36 wherein the surfactant ranges in amount from about 0.1 weight percent to about 5 weight percent of the total composition.

38. The insulated glass unit of claim 37 wherein the surfactant ranges in amount from about 0.2 weight percent to about 1 weight percent of the total composition.

39. The insulated glass unit of claim 1 wherein the transmittance of a sheet of the silicone rubber made as per ASTM test D412 is greater than 40 percent.

40. The insulated glass unit of claim 1 wherein the transmittance of a sheet of the silicone rubber made as per ASTM test D412 is greater than 60 percent.

41. The insulated glass unit of claim 1 wherein the cured composition has a green strength between about 1 psi and about 75 psi after curing for a period of time ranging from about 1 minute to about 60 minutes.

42. The insulated glass unit of claim 1 wherein the cured composition has a green strength between about 1 psi and about 45 psi after curing for a period of time ranging from about 1 minute to about 60 minutes.

43. The insulated glass unit of claim 1 wherein the first part (a) exhibits a change in application rate as measured by WPSTM test E-56 at a temperature of 73° F. and relative humidity of 50 percent from about 7 to about 28 days of less than about 1000 grams/minute.

44. The insulated glass unit of claim 1 wherein the first part (a) exhibits a change in application rate as measured by WPSTM test E-56 at a temperature of 73° F. and relative humidity of 50 percent from about 7 to about 28 days of less than about 300 grams/minute.

45. The insulated glass unit of claim 1 wherein the first part (a) exhibits a change in application rate as measured by WPSTM test E-56 at a temperature of 73° F. and relative humidity of 50 percent from about 7 days to about 14 months of less than about 2000 grams/minute.

46. The insulated glass unit of claim 1 wherein the first part (a) exhibits a change in application rate as measured by WPSTM test E-56 at a temperature of 73° F. and relative humidity of 50 percent from about 7 days to about 14 months of less than about 1000 grams/minute.

* * * * *